March 27, 1956 — A. C. PURPURA — 2,739,768
AIRCRAFT HAVING FEATHERING AIRFOILS
Filed Sept. 27, 1954 — 4 Sheets-Sheet 1

INVENTOR
August C. Purpura

March 27, 1956  A. C. PURPURA  2,739,768
AIRCRAFT HAVING FEATHERING AIRFOILS
Filed Sept. 27, 1954  4 Sheets-Sheet 2

INVENTOR
August C. Purpura

March 27, 1956     A. C. PURPURA     2,739,768
AIRCRAFT HAVING FEATHERING AIRFOILS
Filed Sept. 27, 1954     4 Sheets-Sheet 4
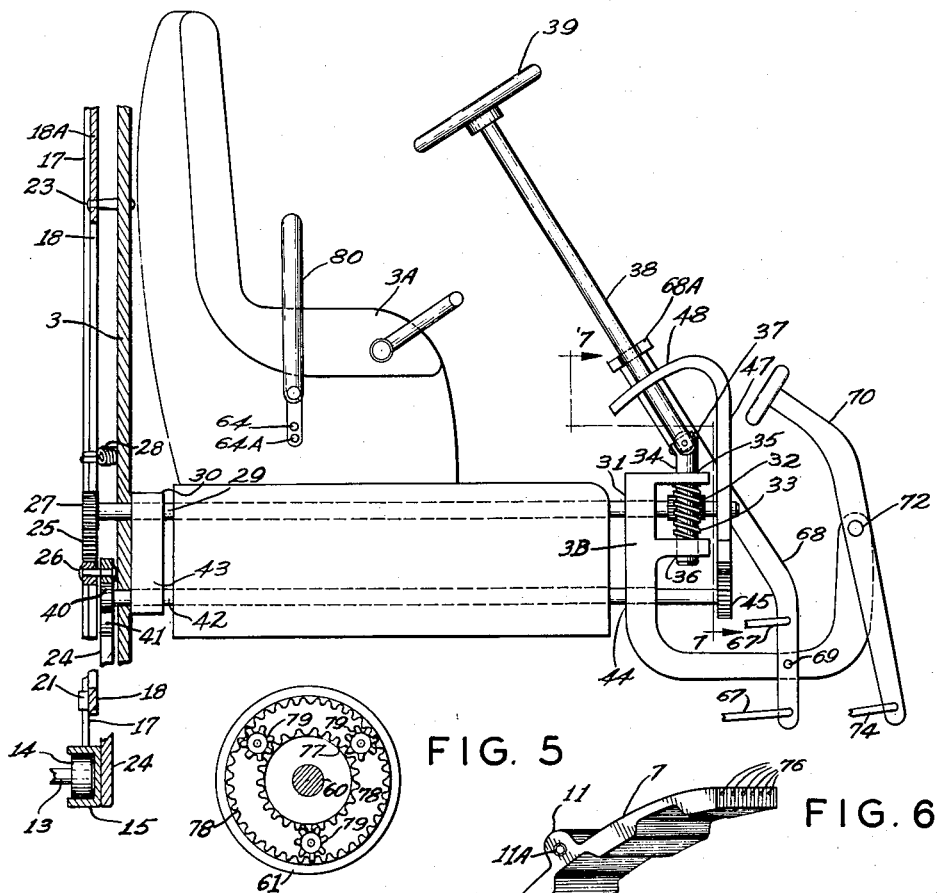
FIG. 4
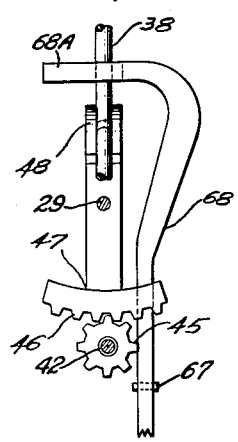
FIG. 5
FIG. 6
FIG. 7
FIG. 9
FIG. 8
INVENTOR
August C. Purpura

United States Patent Office 2,739,768
Patented Mar. 27, 1956

2,739,768

AIRCRAFT HAVING FEATHERING AIRFOILS

August C. Purpura, Berwyn, Ill.

Application September 27, 1954, Serial No. 458,603

11 Claims. (Cl. 244—4)

The invention relates to a new and novel type of aircraft which will operate in vertical and horizontal flight as well as hover without any forward speed.

The object of the invention is to produce an aircraft which will perform more efficiently than the conventional helicopter in vertical flight and which will be capable of speeds up to 200 miles per hour in forward flight.

Another object of the invention is to produce an aircraft which will be simple and inexpensive to manufacture and which can be easily and safely flown.

The present invention uses a new and novel method of creating lift by revolving at high speed a series of airfoils, so designed for obtaining a maximum degree of lift when in vertical flight and which can be set for minimum lift when the aircraft is in maximum horizontal flight. For forward flight I prefer to use two variable pitch propellers driven by two separate engines. A free wheeling or over-running clutch is employed between the engines and propellers so that in the event of engine failure the aircraft is placed in a gliding position and the propellers are then utilized to furnish power for driving the airfoils to maintain a slow and safe descent.

The airfoils are driven and held by a new type of rubber chain having molded within the same a series of wound steel spring wire. This particular chain requires no lubrication, is light in weight and is slipproof and silent in operation, has an exceptional long life and is unbreakable in normal use. However, to maintain utmost safety the rubber chain should be replaced after 1000 hours of flying time.

For stability in flight the angle of attack of the airfoils can be varied in relation to each other so that if necessary, the pilot may increase the angle of attack for the airfoils in the extreme right hand side and decrease the angle of attack on the airfoils on the extreme left hand side, thus giving the same lateral control as do ailerons on conventional aircraft.

To overcome torque the two forward flight propellers are driven in a clockwise direction whereas the airfoils are driven in a counterclockwise direction, viewed from the front.

The various features of novelty whereby my invention is characterized will hereinafter be pointed out with particularity in the claims; but for a full understanding of the invention and of its various objects and advantages, including those just enumerated, reference may be had to the following detailed description taken in connection with the accompanying drawings.

Referring to the drawings:

Fig. 4 is a side elevational view, on a larger scale, of the pilot's seat and adjacent control members, with all of the cabin except the rear wall omitted;

Fig. 5 is a face view of one of the planetary transmissions, with one end cover member removed, for the propellers;

Fig. 6 is a partial perspective view of a segment of chain used in the airfoil assembly;

Fig. 7 is a sectional view, taken on line 7—7 of Fig. 4;

Fig. 8 is a partial front elevational view showing various positions of the air foils; and Fig. 9 is an enlarged view of the cam for tilting the airfoil assembly bodily.

Figure 1:
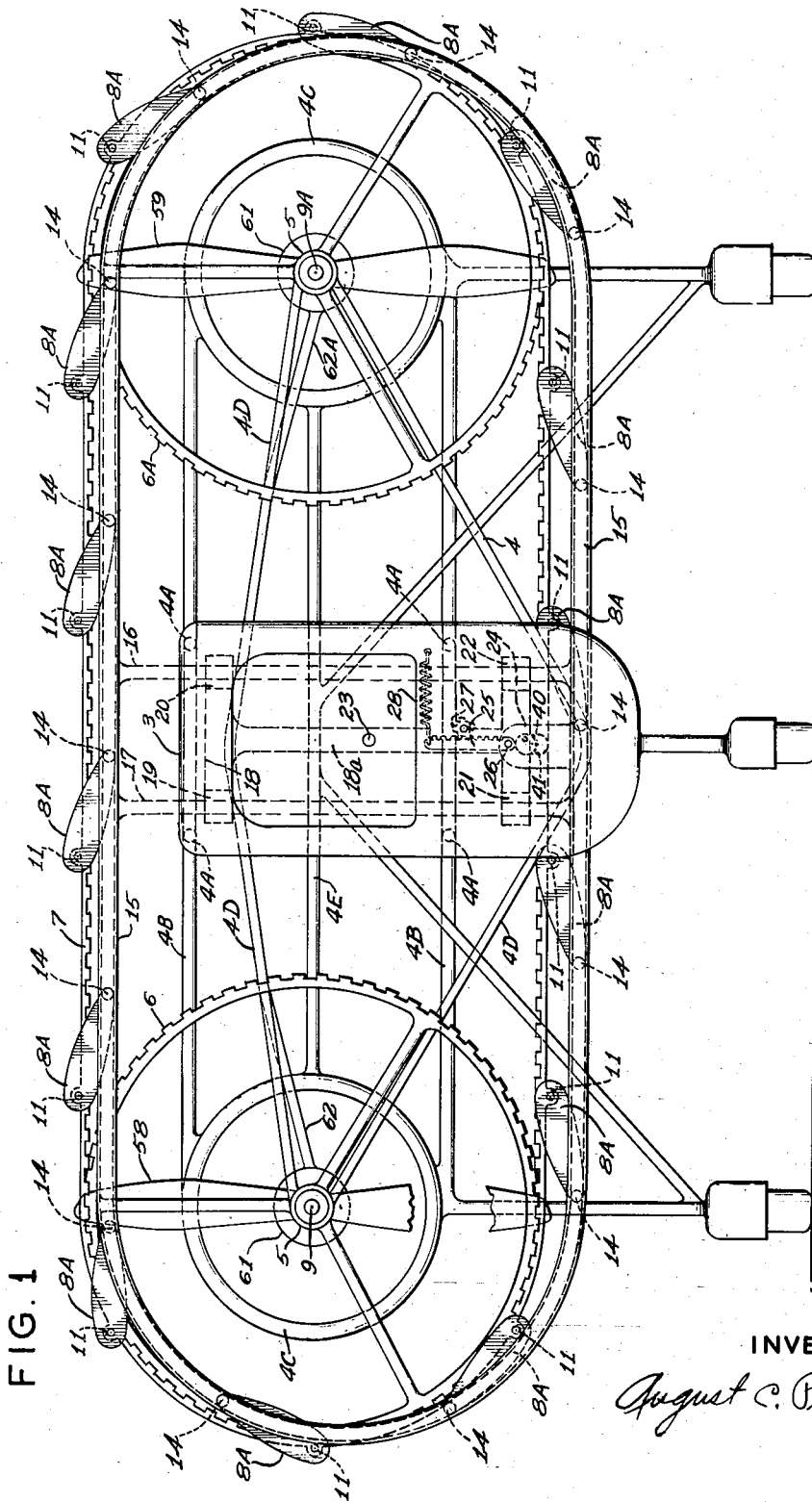
Fig. 1 is a front elevational view of an aircraft that embodies my invention.
Figure 2:
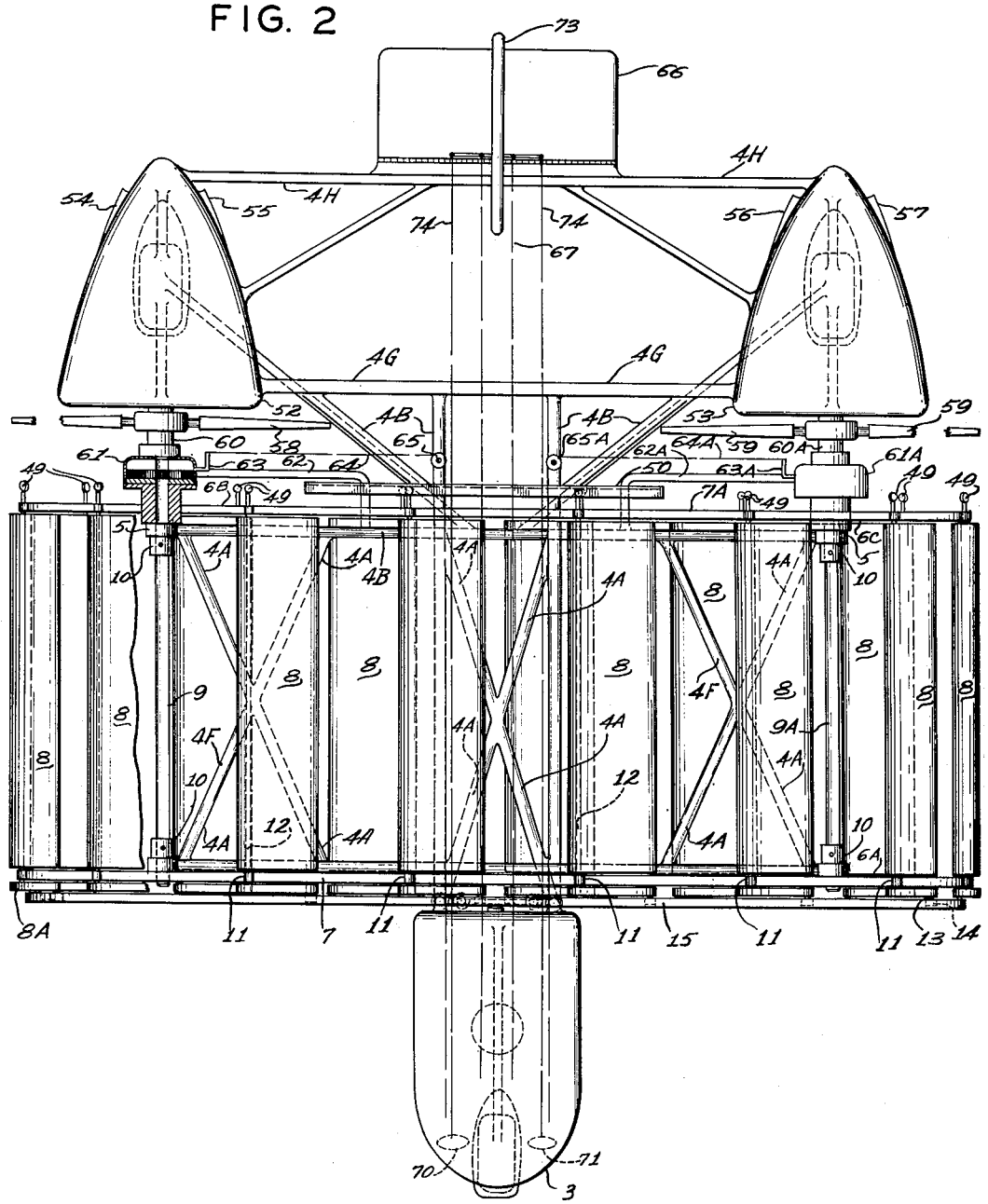
Fig. 2 is a top plan view of such aircraft.
Figure 3:
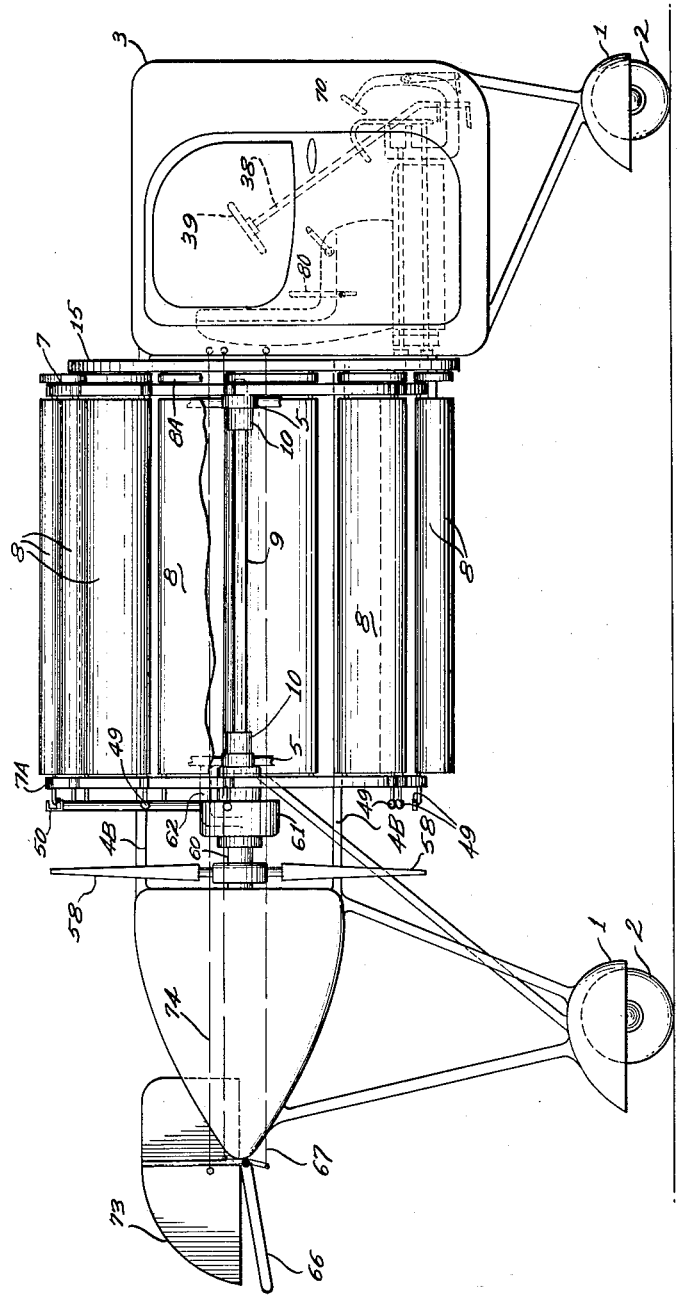
Fig. 3 is a side elevational view of said aircraft.

Detailed drawings and descriptions of certain parts and mechanisms have been omitted for the sake of brevity, since their constructions are old and well known.

My invention consists of an aircraft having the usual landing gear structure 1 provided with conventional landing wheels 2, and at the front with a cabin 3. There is mounted behind and connected to the cabin a streamlined framework 4, preferably formed of tubing and adapted, if desired, to surround any conventional fuselage. The length or transverse dimension of the framework is preferably several times as great as the corresponding dimension of the cabin. On each end of the framework are two bearings 5, 5, spaced apart lengthwise of the aircraft and about midway between the top and bottom of the framework. Two shafts 9 and 9A extend through and are rotatable in these bearings, one on each side of the aircraft. Each of these shafts has a universal joint 10 near each end thereof. These universal joints compensate for any flexure of the bearing supports while the craft is in flight. Mounted on each end of each of these shafts is a thin, light weight sprocket, they being numbered 6, 6A, 6B and 6C. Connecting sprockets 6 and 6A is a rubber chain 7 and connecting sprockets 6B and 6C is a similar chain 7A. Because the sprockets on one side of the aircraft are spaced far apart from the corresponding sprockets on the other side, the chains have straight upper and lower runs that project far beyond both sides of the cabin. Molded integral with the chains at their peripheries are bearing supports 11 and, molded into the same, are suitable bearing sleeves 11A that parallel shafts 9 and 9A. There are fourteen of these bearing supports on each chain, spaced at equal distances apart from each other, and the bearing sleeves on one chain being axially aligned with corresponding sleeves on the other chain.

Extending between the two chains and journalled in the bearing sleeves are light weight shafts 12 which, of course, parallel the longitudinal axis of the aircraft. Mounted on each such shaft, between the chains, is a long, narrow airfoil 8; the shaft being adjacent to the leading edge of the airfoil. Thus the two chains form with the shafts and the airfoils an endless, ladderlike structure which surrounds the aircraft and extends far beyond both sides of the latter. At the front end of each airfoil, namely the end facing toward the front of the craft, is an arm 8A of the same shape in cross section as the airfoil and fixed to the shaft so as, in effect to form an extension of the airfoil spaced a short distance from the latter. Each arm 8A has at its trailing end a small stub shaft 13 on which is a freely rotatable roller 14.

Just in advance of the endless ladder-like airfoil assembly is an endless, rigid, channeled track or guide 15, the contour of which is substantially the same as the path of travel of the shafts 12 or the contour of one of the chains. This guide is placed in a vertical position with its upper and lower straight sections not far from and paralleling the corresponding portions of the near chain. The parts are so proportioned that rollers 14 extend into the channel in guide 15 and travel along the same when the ladder-like assembly is in operation.

Since the airfoils and their shafts are able to rock up and down, the guide determines the positions which they occupy at any time so far as their angle of attack is concerned. It has previously been proposed to employ in a somewhat similar assembly a guide which may be raised and lowered, thereby making it possible to vary the angle of attack of all of the airfoils uniformly. In accordance with the present invention the guide is so mounted that it may move bodily up and down and also be tilted in its own plane, so that its straight sections are no longer parallel with the upper and lower runs of the ladder-like assembly. This tilting movement permits the angle of attack at one end of each run of the said assembly to be increased or decreased while producing the opposite effect at the other end; and, when tilting is carried far enough, causing the angle of attack at one end of such run to be the reverse of the angle of attack at the opposite end.

In order to achieve these two dissimilar movements of the air foils I mount the guide on a support member 18 in such manner that it may slide up and down on the latter, member 18 being mounted on the stationary framework or part fixed to the latter so that it may tilt from side to side. In the arrangement shown, the upper and lower straight sections of guide 15 are connected by two parallel rods or bars 16 and 17, one on each side of the center. Member 18 has thereon four bearings, 19, 20, 21 and 22, located at the four corners of a rectangle, in which rods 16 and 17 are slidably mounted. Member 18 is shown as being mounted on a pivot 23 projecting rearward from the rear wall of the cabin; the pivot being at the center of member 18 which may be any flat structure as, for example, a light, rectangular frame provided with a central vertical bar element 18A through which pivot 23 extends.

Means must be provided to lock the guide to support 18 in any desired relative position and to move it from one position to another. To this end I weld to the lower straight section of guide 15 a small vertical plate 24 that overlaps the lower portion of support 18. A vertical gear rack 25 is connected to its lower end to plate 24 by a pivot pin 26. In position to mesh with the rack is a pinion 27 mounted on the rear end of a shaft 29 that extends rearward from the cabin; the axis of the pinion therefore being stationary. A spring 28, connected at one end to rack 25 and at its other end to the rear wall of the cabin, holds the rack yieldingly against the pinion in all positions of the guide and support 18.

Shaft 29 has a bearing 30 at the rear of the cabin and another bearing forwardly of the pilot's seat 3A, namely a bearing 31 on a stationary upright bracket 3B. On the front end of shaft 29 is a pinion 32 which is in mesh with a worm gear 33 mounted on a vertical shaft 34 journalled in bearings 35 and 36 in said bracket. A universal joint 37 connects the upper end of shaft 34 to a control shaft 38 provided with a hand wheel 39 within easy reach of a pilot sitting on seat 3A. When the pilot turns the hand wheel he causes shaft 29 and pinion 27 to turn; thereby raising or lowering guide 15.

Tilting of the guide is effected by a cam 40 positioned in a central vertical slot 41 in plate 24. When the cam is turned a tilting force is applied to the guide and, because the guide and support 18 cannot turn relatively to each other, such force is transmitted to the latter and causes it to turn; the guide being compelled to shift angularly about pivot 23 along with the support member. Cam 40 is on the rear end of shaft 42 which, also, extends forward into the cabin where it is provided with a rear bearing 43 and a bearing 44 on bracket 3B. On the front end of shaft 42 is a pinion 45 that meshes with a gear segment 46 on the lower end of a vertical arm 47 mounted on shaft 29 for rotation relatively thereto. This arm has at its upper end a rearwardly extending, slotted or forked portion 48 that straddles control shaft 38. The pilot needs only to tilt the control shaft toward the right or left in order to tilt or rock the guide 15; thereby increasing the angle of attack on the extreme right hand side, for example, while decreasing the angle of attack on the left hand side. By this means the pilot may stabilize the aircraft in flight exactly as he could with ailerons in conventional airplanes. He may also use this control for banking the craft while making turns in flight.

On the rear ends of shafts 12 are rollers 49. These rollers ride on a channeled guide 50 paralleling the central portion of the upper run of rear chain 7A, preventing this chain from jumping off the sprockets during flight.

In the rear of the aircraft are engines represented only by their streamlined housings 52 and 53. At the extreme ends of the housings are air vents 54, 55, 56, and 57, permitting air to flow through the housings for cooling the engines. Propellers 58 and 59 are driven by the engines in any suitable way. In the arrangement shown, the propellers are just in front of and in axial alignment with the engines. They are of the controllable pitch type and, between the same and the engines are overrunning clutches necessary for leaving the propellers free to turn and drive the airfoils and make possible a slow and safe descent in case of engine failure.

The front ends of the propellers are connected to shaft extensions 60 and 60A, respectively, and these extensions enter planetary transmission housings 61 and 61A, respectively. These housings are held in position by tubular arms 62 and 62A each connected at one end to a housing and at its other end to the framework 4. Levers 63 and 63A, projecting from the transmission housings are the clutch engaging and releasing arms. These levers are actuated from within the cabin by suitable cables 64 and 64A which run over pulleys 65 and 65A and are connected to a control arm 80 in the cabin.

Conventional elevators 66, at the tail end of the craft are operated by cables 67 each connected at one end to the elevators and at the other end to a lever 68 that is supported on bracket 3B by a pivot 69, as shown in Fig. 4. The upper end of this lever is bent laterally as at 68A, this lateral part being in the form of a fork through which control shaft 38 extends. With this construction, forward and backward movement of the control shaft rocks lever 68 and thereby operates the elevators.

In the cabin are two foot pedals 70 and 71, the first of which is shown as pivotally mounted on bracket 3B; and the other may be similarly mounted. These pedals are connected to a conventional rudder 73 by two cables 74.

Hence stability may easily be controlled by the pilot by merely moving wheel 39 forward or backward, or by moving it bodily to the left or right; and it is also easy for the pilot to control the lift of the airfoils by merely turning this wheel, or to turn the aircraft by moving the foot pedals.

Fig. 5 is a more or less diagrammatic view of one of the planetary transmissions. The small central gear 77 is driven by the corresponding propeller shaft. The large internal gear 78 drives the corresponding airfoil shaft, 9 or 9A. The spider gears 79 are mounted on a rotatable web, not shown, but which serves as one member of a conventional clutch of which the cooperating member is controlled by lever 63 or 63A so as either to lock the web against movement or allow it to rotate freely. When the web is locked, the spider gears are able to drive the corresponding airfoil shaft; but, when the web is free to rotate no power can be delivered to the latter shaft.

In Fig. 6 there is shown a preferred construction of the rubber chains, the same having strands of steel spring wire 76 molded within the same for maximum tensile strength.

In Fig. 8 I have illustrated diagrammatically the range of adjustment for the air foils other than variations created by tilting the guide 15. The position shown at 75 is that in which the air foils are set when the aircraft is in maximum forward flight. In this position the air foils and arms thereon are in registration with the guide and not at angles thereto, and thus the drag against forward flight is reduced to a minimum.

As heretofore stated, framework 4 is preferably composed of tubular elements. In the arrangement shown, there are four long longitudinal elements 4A to the front ends of which the cabin is attached; together with four cross elements 4B fixed to said longitudinal members. The ends of elements 4A are welded to four tubular rings 4C concentric with shafts 9 and 9A and supporting bearings 5. The two front bearing members 5 are connected together by a diamond shaped, tubular frame 4D, and a similar frame connects the two rear bearing members to each other. The tubular rings are also connected together by tubular elements 4E. The main transverse elements of the framework are braced by tubular X-shaped frames 4F extending between them and fixed thereto. Main frame members 4A extend rearwardly and are fixed to a cross member 4G that spans the distance between the front ends of the engine housings and is fixed to the same. An additional tubular cross element 4H connects the rear ends of the housings 52 and 53 together.

Flight operation is as follows:

Before starting the engines the clutch controlling lever 80 is actuated for releasing the power to the airfoils shaft 9 and 9A. The pitch of the propellers 58 and 59 is set at zero or just slightly beyond so that enough air pressure will be created to cool the engines. After the engines are started and properly warmed up, the pitch of the airfoils is set at minimum lift by turning the hand wheel 39 and the clutch in the planetary transmission is engaged by moving the lever 80 so that the airfoils are now engine driven. The throttles of both engines are now opened up and the angle of attack of the airfoils 8 is slowly increased by turning the hand wheel 39. The aircraft will now slowly begin to climb without any forward motion of the craft. When the desired altitude is reached the angle of attack of the airfoils 8 is decreased just enough to maintain altitude and the pitch of both propellers 58 and 59 is slowly increased so that the aircraft will now fly forward. When it is desired to make a landing the pitch of the propellers 58 and 59 is decreased when the landing site is approached and the pitch of the airfoils 8 is first increased to compensate for the loss of lift due to loss of forward speed. Then the airfoils angle of attack is slowly decreased until the desired rate of descent is attained.

It is thought that the invention and its attendant advantages will be understood from the foregoing description and it will be apparent that various changes may be made in the form, construction and arrangement of the parts without departing from the spirit and scope of the invention or sacrificing any of its material advantages, the form hereinbefore described being merely a preferred embodiment thereof.

I claim as my invention:

1. An aircraft comprising a cabin and a framework in rear of and fixed to the cabin, an endless ladder-like unit surrounding the framework and extending beyond each side of the cabin, means to support said unit to provide straight transverse runs above and below the framework, hinged air foils forming the rungs of the ladder, control means adjacent to said unit to shift the airfoils during the operation of the unit to vary the angle of attack of the airfoils, said control means including a guide engaging the airfoils to determine their angular positions at different points in their path of travel and being movably mounted on the framework, means to shift the guide, and means to drive said unit at high speed.

2. An aircraft comprising a cabin and a framework in rear of and fixed to the cabin, an endless ladder-like unit surrounding the framework and having long straight runs extending transversely of the aircraft above and below and a substantial distance beyond each side of the cabin, said unit including long airfoils parallel to the longitudinal axis of the aircraft and hingedly connected in said unit for swinging movements about axes parallel to the aforesaid axis, control means adjacent to said unit to increase and decrease the angle of attack of the airfoils at one end of each run and simultaneously to decrease and increase, respectively, the angle of the airfoils at the other ends of said runs, said control means including a guide engaging the airfoils to determine their angular positions at different points in their path of travel and being movably mounted on the framework, means to shift the guide, and means to drive said unit.

3. An aircraft as set forth in claim 2, wherein the guide so shaped that the angle of attack at one end of a run may be caused to be in the reverse direction from that of an airfoil at the other end of that run.

4. An aircraft as set forth in claim 2 wherein each of the airfoils is mounted in the endless, ladder-like unit so as to be angularly movable about an axis close to the leading edge.

5. An aircraft as set forth in claim 2 wherein each airfoil is mounted to swing about an axis parallel and near the leading edge, wherein the immediate control means is an endless guide to form a track beside the ladder-like unit, wherein each airfoil has a roller the axis of which is in a line parallel to and at the trailing edge and which is interlocked with the guide, and wherein the guide is mounted for rocking movements in its own plane.

6. An aircraft as set forth in claim 2 wherein the guide is mounted on a member that is pivotally supported for rocking movements about a fixed axis, and wherein the mounting of the guide on that member is such that the guide may slide up and down on the latter; said fixed axis being at right angles to the plane of the guide.

7. The combination with an aircraft structure, of propeller means to move it in the forward direction, an endless, ladder-like unit surrounding said structure and having long, straight upper and lower runs movable at right angles to said direction, the rungs of the ladder being airfoils arranged parallel to said direction and each being mounted for angular movements about an axis parallel to the leading edge, means to drive both the propeller and said unit, a device engaged with said airfoils to determine the angle of attack thereof, and means for operating said device to cause either uniform changes in the angle of attack of all the airfoils along the straight runs of said unit or changes resulting in the angle of attack becoming less at one end of each run than at the other end.

8. A combination as set forth in claim 7, wherein the parts are so proportioned that the angle of attack of an airfoil at one end of a straight run may be caused to be the reverse of the angle of a foil at the other end of that run.

9. The combination with an aircraft structure having a cabin at the front, of means to propel the same in the forward direction, an endless, ladder-like unit surrounding said structure and having long, straight runs above and below and extending crosswise of the latter, airfoils forming the rungs of the ladder, an endless guide beside the unit and mounted on said structure for up and down and rocking movements, a connection between each airfoil and said guide to determine the angles of attack of the airfoils, an operator's control shaft mounted in the cabin for rotary and rocking movements, and means operated by the shaft to tilt the guide when the shaft is rocked and to move the guide up and down when the shaft is turned in one direction or the other, respectively.

10. In an aircraft comprising a cabin and framework connected thereto, an endless ladder-like unit surrounding and extending beyond each side of the cabin and supported by said framework to provide long, straight runs above and below said framework, airfoils forming rungs of the ladder, and control means adjacent to the said unit to shift the airfoils during the operation of the unit to increase or decrease the angle of attack at one end of each of said runs and simultaneously decrease or increase, respectively, the angle of attack of the airfoils at the other ends of the latter runs.

11. In an aircraft having a cabin and a framework attached thereto to form with the same a triangular pattern with the cabin forming the front corner of the triangle, and an engine mounted adjacent to each of the two rear corners of the triangle, a series of airfoils revolving around and across the center of gravity of the aircraft, the airfoils being pivoted adjacent to their leading edges, and manually controlled means for varying the angles of attack of the airfoils, and driving connections between both engines and the airfoils.

References Cited in the file of this patent

UNITED STATES PATENTS 1,632,811    Watter            June 21, 1927

FOREIGN PATENTS 45,981    Denmark           July 15, 1932